United States Patent [19]
Lerminiaux et al.

[11] Patent Number: 5,521,993
[45] Date of Patent: May 28, 1996

[54] PROCESS FOR MANUFACTURING AN INTEGRATED OPTICAL PROXIMITY COUPLER

[75] Inventors: Christian Lerminiaux, Fontainebleau; Bertrand Paris, Avon, both of France

[73] Assignee: Corning Incorporated, Corning, N.Y.

[21] Appl. No.: 353,465

[22] Filed: Dec. 9, 1994

Related U.S. Application Data

[62] Division of Ser. No. 993,730, Dec. 18, 1992, Pat. No. 5,448,658.

[30] Foreign Application Priority Data

Dec. 23, 1991 [FR] France .................................. 91 15992

[51] Int. Cl.$^6$ .......................... G02B 6/12; H04J 14/00; C03B 37/023
[52] U.S. Cl. .................. 385/14; 385/24; 385/42; 385/50; 385/130; 359/115; 359/127; 65/385; 65/386; 65/402
[58] Field of Search ..................... 385/14, 15, 24, 385/27, 30, 42, 43, 50, 51, 129, 130, 131, 132; 65/385, 386, 402; 359/115, 127

[56] References Cited

U.S. PATENT DOCUMENTS

| 4,652,076 | 3/1987  | Unger ................................ 385/14 X |
| 4,886,538 | 12/1989 | Mahapatra ........................ 65/30.13 |
| 4,998,791 | 3/1991  | Koai .................................. 385/14 X |
| 5,117,470 | 5/1992  | Inoue et al. ........................ 385/14 |
| 5,148,507 | 9/1992  | Tanisawa .......................... 385/41 |
| 5,293,436 | 3/1994  | Diemeer ........................... 385/11 |
| 5,448,658 | 9/1995  | Lerminiaux et al. ............... 385/14 |

FOREIGN PATENT DOCUMENTS

| 0130223   | 1/1985  | European Pat. Off. ............. 385/14 X |
| 0136839   | 4/1985  | European Pat. Off. ............. 372/43 X |
| 0395060   | 10/1990 | European Pat. Off. ............. 385/14 X |
| 0444582   | 9/1991  | European Pat. Off. ............. 385/14 X |
| 286883    | 10/1983 | Germany ........................... 385/14 X |
| 60-154208 | 8/1985  | Japan ................................. 385/14 X |
| 63-170602 | 7/1988  | Japan ................................. 385/14 X |
| 2-52316   | 2/1990  | Japan ................................. 385/14 X |
| 3-239206  | 10/1991 | Japan ................................. 385/14 X |

OTHER PUBLICATIONS

R. A. Betts et al., "Tunable Couplers Fabricated in K+/Na+ Ion Exchanged Glass", *Electronic Letters*, vol. 26, No. 12, Jun. 1990, pp. 786–788, Stevenage, Herts., U.K.

A. Takagi et al., "Broadband Silica–Based Optical Waveguide Coupler With Asymmetric Structure", *Electronics Letters*, vol. 26, No. 2, Jan. 1, 1990, pp. 132–133, Stevenage, Herts., GB.

H. C. Cheng et al., "A Dual Wavelength (1.3–1.56 μm) Directional Coupler Demultiplexer by Ion Exchanger in Glass", *IEEE Photonics Tech. Letters*, No. 9, Sep. 2, 1990, pp. 637–639.

C. G. Nutt et al., "Passive Tuning of LiNbO$_3$ Directional Coupler Structures", *ECOC 88*, 11–15 Sep. 1988, Part 1, pp. 595–598.

*Primary Examiner*—Brian Healy
*Attorney, Agent, or Firm*—K. McNeill Taylor, Jr.; Gunnar G. Leinberg

[57] ABSTRACT

A device, utilized for the separation or combination of two signals of different wavelengths, of the type in which the waveguides comprise straight interaction segments ($1_1$, $2_1$; $1_{in}$, $'2_{in}$) parallel and close to one another and to curved approach segments with inflection points ($1_2$, $2_2$, $1_3$, $2_3$; $1_{2n}$, $2_{2n}$, $1_{3n}$, $2_{3n}$), connected to the ends of the straight segments, and, for certain ones, to inputs/outputs (4,5,6) of the device. In accordance with the invention, the approach segments situated on at least the same side of the straight segments are free of any inflection point, the coupling of the straight segments being optionally modified to compensate for the variation of the coupling between the waveguides along said approach segments due to the omission of the inflection points.

2 Claims, 4 Drawing Sheets

FIG. 1A (Prior Art)
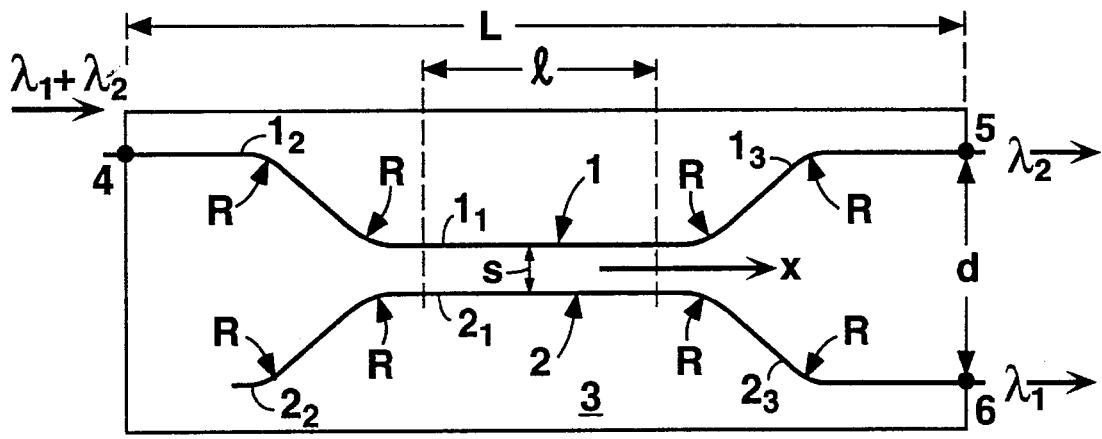
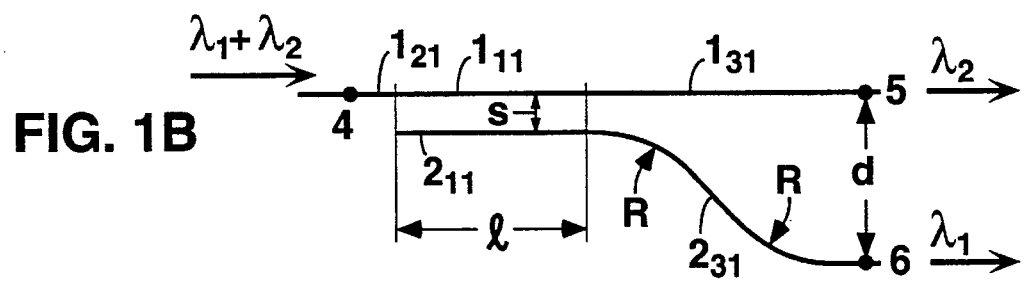
FIG. 1B
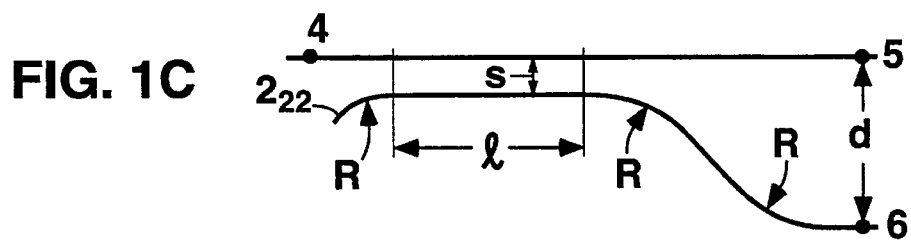
FIG. 1C
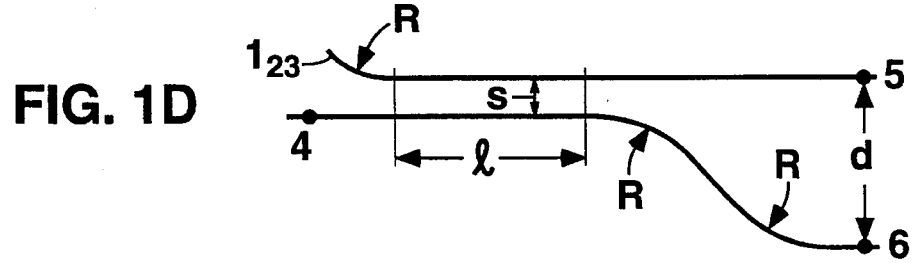
FIG. 1D
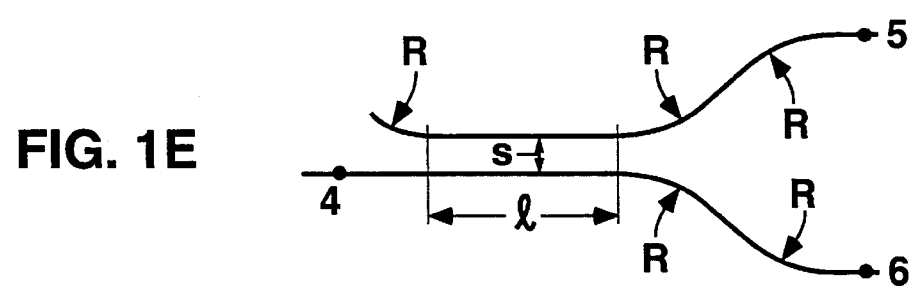
FIG. 1E

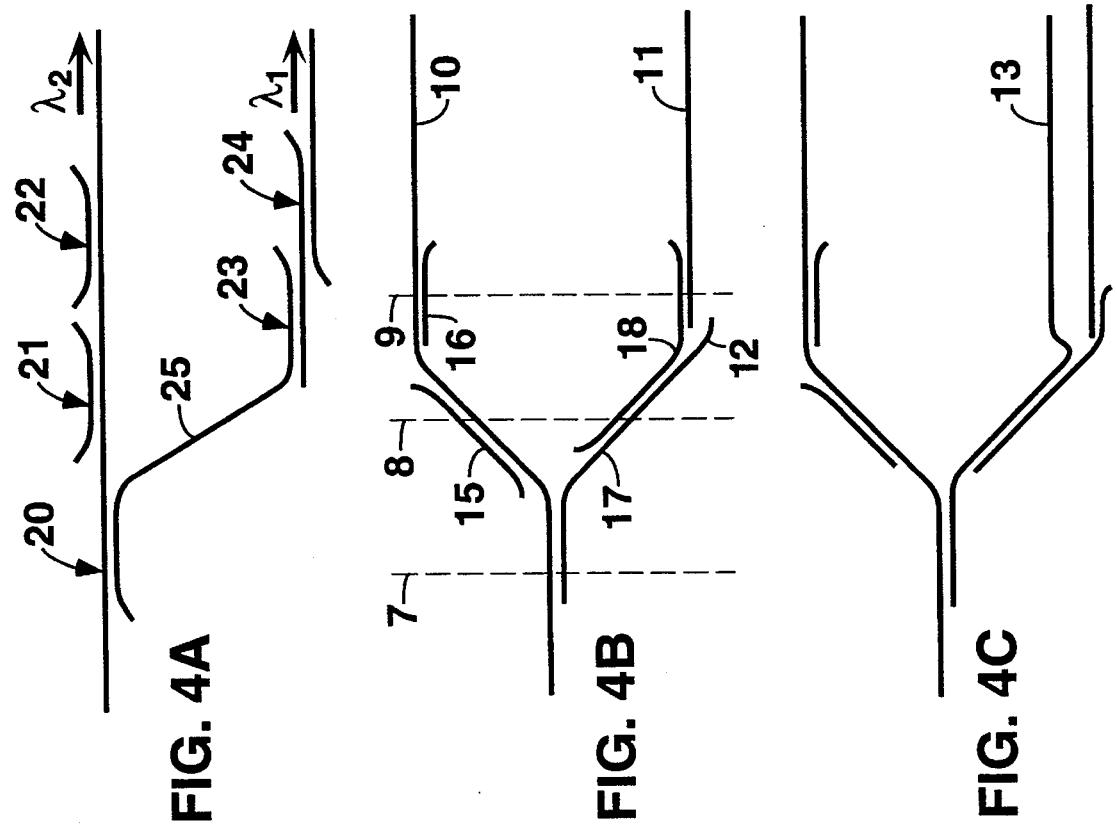

PROCESS FOR MANUFACTURING AN INTEGRATED OPTICAL PROXIMITY COUPLER

This is a division of application Ser. No. 07/993,730, filed Dec. 18, 1992, now U.S. Pat. No. 5,448,658.

BACKGROUND OF THE INVENTION

The present invention relates to an optical device for proximity coupling between two waveguides integrated in a substrate and, more particularly, to such a device applicable to the realization of multiplexers/demultiplexers or filters of reduced dimension. The present invention relates also to an integrated optical component comprising a combination of such multiplexers/demultiplexers and filters.

Proximity couplers such as that which is represented schematically in FIG. 1A in the drawings attached to the present patent application are known. Such a coupler is currently being utilized in the multiplexing/demultiplexing of two signals of different wavelengths. It comprises two waveguides 1,2 integrated by exchange of ions such as the ion thallium, for example, in a glass substrate 3 or in a crystalline substrate. The ion exchange is brought about by means of a mask which defines the form of the waveguides. As is shown, these latter consist of straight interaction segments $1_1$, $2_1$ parallel and neighboring, and approach segments $1_2$, $1_3$, and $2_2$, $2_3$, respectively, connected to inputs/outputs or "ports" 4, 5, 6, ports 5 and 6 being separated by a distance fixed by the diameter of coated optical fibers (not shown) which are attached to these ports by a technique of "pigtailing", for example.

Thus, signals of wavelengths $\lambda_1$, and $\lambda_2$ ($\lambda_1 < \lambda_2$) entering by port 4 exit separately through ports 5 and 6, the signal at one of the wavelengths passing into waveguide 2 because of the crossing over of evanescent waves in the substrate between the straight interaction segments $1_2$ and $2_2$ of the guides, in particular. The response curve of such a coupler typically takes the form represented in FIG. 2 which makes evident two attenuation peaks centered along the wavelengths $\lambda_1=1300$ nm and $\lambda_2=1550$ nm, as is the case, for example, when one utilizes such a coupler in optical fiber telecommunications. It is clear that the signal at wavelength $\lambda_2=1550$ nm is very attenuated at port 6, when the signal at wavelength $\lambda_1=1300$ nm in practice is not, and inversely at port 5. One can thus separate, for example, a signal carrying an audio signal from a signal carrying a video signal, transmitted together in the same optical fiber. The same signals can be combined in the same fiber advancing in the opposite direction in the coupler of FIG. 1A.

As depicted in this FIG., the approach segments of the proximity coupler are shaped in such a manner as to absorb the spatial displacement of the inputs/outputs 5, 6 of the coupler, currently on the order of 350 μm for reducing the separation s of the straight segments of guide to the order of ten microns, typically 8–20 μm, thereby reducing to a minimum the curvature losses, which requires the use of a large radius of curvature R for these approach segments, typically on the order of 100 mm. Two successive sections of the guides exhibiting this curvature and connected by an inflection point are therefore normally necessary in order to form an approach segment. Because of the large radius of curvature which is used, these approach segments therefore have a significant longitudinal dimension, representing typically ¾ of the total length of the coupler, which can then easily reach approximately 22 mm when the length 1 of the straight interaction segments ($1_1$, $2_1$) of the waveguides, which assures the essentials of coupling, is on the order of 5 to 10 mm, approximately.

Concerning integrated devices, made with the aid of masks, there exists a need for a more compact configuration of these devices, allowing the arrangement of a greater number on the same planar area of a glass substrate, for example, which permits a proportional increase in the volume of production for these devices.

More compact devices would permit the manufacture of integrated optical components combining multiplexers/demultiplexers, filters, etc., which themselves benefit by a reduction in dimension.

The present invention therefore has as its object the furnishing of an optical device for proximity coupling, especially permitting the realization of directional proximity couplers or multiplexers/demultiplexers in integrated optics with reduced dimensions.

The present invention also has as its object the furnishing of such a device which should be equally applicable to the realization of integrated optical filters with reduced dimensions, and to the realization of integrated optical components combining, for example in parallel or in series, such multiplexers/demultiplexers and of such filters.

We achieve these objects of the invention, as well as others which will appear upon reading the description which will follow.

According to one aspect of the invention, we provide an integrated optical device for proximity coupling between two waveguides in order to separate or combine signals of different wavelengths, including a coupling region where most of said coupling takes place comprising two straight interaction segments of said waveguides parallel and near to one another, and further comprising one or more approach segments of said waveguides coupled to said coupling region on each of its two sides by connection to one or more ends of said straight interaction segments, characterized in that said approach segments on one side of said coupling region are free of any inflection point, and the coupling length (1) and separation (s) of the straight interaction segments are adjusted in order to compensate for the variation of the coupling between the guides along said approach segments resulting from the removal of the inflection points.

The removal of the inflection points is a consequence of the reduction of the length of the curved sections of the approach segments which generates a substantial benefit in the longitudinal dimension of the device, this latter without modification of the coupling of the guides, thanks to a compensating modification of the coupling of the straight interaction segments, as will be seen later.

According to another aspect of the invention, we provide an integrated optical device for proximity coupling between two waveguides in order to separate or combine signals of different wavelengths, including a coupling region where most of said coupling takes place comprising two straight interaction segments of said waveguides parallel and near to one another, and further comprising one or more approach segments of said waveguides coupled to said coupling region on each of its two sides by connection to one or more ends of said straight interaction segments, characterized in that said device comprises a filter, and at least one of said approach segments comprises an exit end segment which is curved without any inflection point and terminates in the substrate of said integrated optical device, the length and curvature of said exit end segment being fixed to avoid recoupling of the light energy which is transmitted through said segment into said substrate.

According to still another aspect of the invention, we provide an integrated optical device for proximity coupling between two waveguides in order to separate or combine signals of different wavelengths, including a coupling region where most of said coupling takes place comprising two straight interaction segments of said waveguides parallel and near to one another, and further comprising one or more approach segments of said waveguides coupled to said coupling region on each of its two sides by connection to one or more ends of said straight interaction segments, characterized in that the approach segments at least on one side of said coupling region are free of any inflection point, at least one of said approach segments without inflection point is rectilinear and collinear with the straight interaction segment to which it is connected and is connected through its opposite end to an input/output of said device, and at least one of said approach segments comprises an exit end segment which is curved without any inflection point and terminates in the substrate of said integrated optical device, the length and curvature of said exit end segment being fixed to avoid any recoupling of the light energy which is transmitted through said segment into said substrate.

In accordance with the process for making such devices operating at predetermined wavelengths, the location of such wavelengths is adjusted by a heat treatment procedure after the waveguides are integrated in the substrate of the device.

It is an important characteristic of the device according to the invention that the coupling length and the separation of the straight interaction segments of the guides are adjusted to compensate for the variation in coupling of the approach segments with respect to the coupling of approach parts having inflection points, due to the omission of these inflection points.

The device, in accordance with the invention, is applicable to the realization of a proximity coupler or multiplexer/demultiplexer of two signals comprising on the one hand an input/output attached at one end of one of the two waveguides and, on the other hand, two inputs/outputs attached each to one of the other ends of the two waveguides, the coupling being characterized in that, on the side of the apparatus which comprises a single input/output, the approach segments are devoid of inflection points.

The device in accordance with the invention is also applicable to the realization of a filter for extracting one of the input signals and for transmitting the other, this filter being characterized in that an approach segment, rectilinear and collinear with a straight interaction segment on one of the waveguides, is attached to an input of the filter.

Other characteristics and advantages of the device in accordance with the invention will appear upon reading the description which will follow and upon examining the attached drawings in which:

FIGS. 1A–E depicts the proximity coupler of the prior art described in the introduction to the present description, and FIGS. 1B to 1E depict various embodiments of a multiplexer/demultiplexer in accordance with the present invention, FIG. 2 depicts the response curve of such a coupler multiplexer/demultiplexer, likewise described in the introduction to the present specification, FIG. 3A–G depicts schematically various embodiments of integrated optical components in accordance with the present invention in which proximity couplers and filters in accordance with the invention are combined, FIG. 4A–E depicts several designs of proximity couplers.

We have depicted in designs B, C, D, E of FIGS. 1A–1E, various embodiments of a device in accordance with the invention, taking the form of a directional proximity coupler using a multiplexer/demultiplexer of two signals of wavelength $\lambda_1$ and $\lambda_2$, the same function as the known proximity coupler represented in A and described in the introduction to the present specification.

Figure 2:
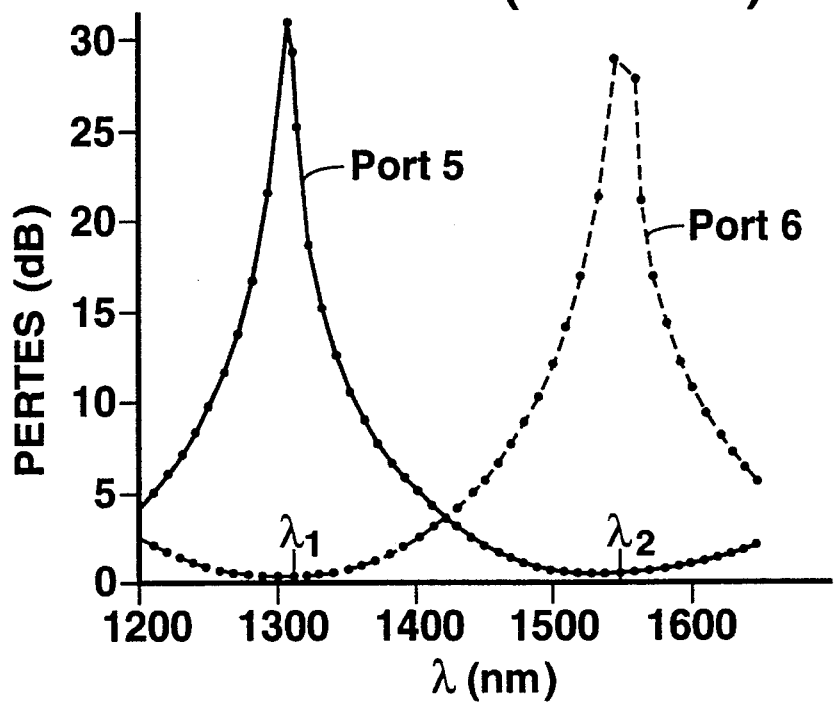

As we have seen likewise in the introduction and as a non-limiting example, the wavelengths can be such as $\lambda_1=1310$ nm and $\lambda_2=1550$ nm, following a standard utilized in optical fiber telecommunications. In this application the positions and the widths of the peaks of the graphs in FIG. 2 are defined with tolerances which must be respected. The present invention has as its object especially the furnishing of a proximity coupler with reduced longitudinal dimension, without this reduction of dimension bringing with it unacceptable modifications in the response curve which is depicted in FIG. 2. It is to be noted incidentally that the transverse dimension of the coupler is limited by the separation d of the inputs/outputs 5 and 6 of the coupler, itself a function of the diameter of the coated optical fibers which are connected to these inputs/outputs or ports.

At this point in the specification, it is necessary to pay attention to the organization of the coupling of the waveguides 1 and 2 of the coupler FIG. 1A. It is known that the efficiency $\eta$ of the transfer of energy between the guides is of the form: $\eta=\mathrm{Sin}^2$ (cl+2$\phi$), l being the length of the straight interaction segments of the coupler, c being a coefficient which depends at one and the same time on the separation s of the straight interaction segments and the wavelength $\lambda$ of the light transmitted and $\phi$ being a magnitude homogeneous with cl and representative of the coupling existing between each pair of approach segments ($1_2$, $2_2$) and ($1_3$, $2_3$), under the hypothesis in which the latter are identical, as in FIG. 1A. Across the approach segments, the coupling of these segments is not constant, as it is a function of the variable separation of the guides. Taking Note of C(s(x)), the coupling coefficient of the guides at the horizontal coordinate x of an approach segment, where s represents the distance between the straight interaction segments, one can write:

$$\int_{approche} C(s(x))dx = C(s)x_o$$

$x_o$ being comparable to an additional length of coupling. $x_o$ is a function of the wavelength $\lambda$ of the signal being considered and the distance s of the straight segments of the guides. We demonstrate that:

$$x_o(\lambda, s) = 2A(\lambda)\sqrt{s}\ \frac{e^{b(\lambda)s}}{\pi} \int_0^\infty \frac{\pi}{2A(\lambda)} \frac{e^{-b(\lambda)s}}{\sqrt{s}} \frac{e^{-b(\lambda)\frac{x^o}{2R}}}{\sqrt{1+\frac{x^2}{2sR}}} dx$$

With:

$$b(\lambda) = \frac{(V(\lambda)-1)}{\rho}$$

$$A(\lambda) =$$

-continued $$\left[\frac{(V(\lambda)+1)^2}{2V(\lambda)\sqrt[3]{V(\lambda)-1}} \cdot \left(\pi\frac{\rho}{\lambda}\right)^{1/2}\right] \exp\left(-\frac{(V(\lambda)-1)^2}{V(\lambda)+1}\right)$$

$$V(\lambda) = 2\frac{\pi}{\lambda} \rho n_{c0} \sqrt{2\delta}$$

where $n_{co}$ is the core index of the guide, $\rho$ is its radius at 1/e, $\delta$ is the maximum difference between the index of the guide and the index of the substrate, R is the radius of curvature being utilized, and $\lambda$ is the wavelength of interest.

In fact, if $x_o$ varies substantially as a function of wavelength, this parameter varies little as a function of distance s.

From the preceding it results that the coupling of the waveguides is a function of the coupling established by the straight interaction segments $1_1$, $2_1$, and by that which is introduced additionally by the approach segments, the coupling introduced by these segments growing stronger when the latter approach each other up to their connection to the straight interaction segments. We understand that a modification of the form of these approach segments with respect to the standard form represented in FIG. 1A brings about a modification of total coupling. Now, the positions and widths of the peaks of the graphs of FIG. 2 can not be maintained unless the total coupling is itself maintained. We will keep this present observation in mind until the presentation which will follow the characteristics of the present invention.

Accordingly, we reduce the longitudinal distance L of the coupler by shortening at least certain approach segments which occupy, as we have seen above, approximately ¾ of the length L of the coupler depicted in FIG. 1A, because of the necessarily large radius of curvature of the guide utilized in these segments. In this coupler (FIG. 1A), these segments require at least one inflection point separating two sections of large radius of curvature R, on the order of 100 mm, for example. This radius may, further more, be the same for all the approach segments, as depicted. One can also choose the radius of curvature of at least one approach segment in such a way as to improve the isolation between the signals of wavelengths $\lambda_1$ and $\lambda_2$.

In accordance with an essential characteristic of the present invention illustrated especially in the embodiment depicted in FIG. 1B, we have removed any inflection point and even any curvature in the approach segments situated on the same side, with respect to the straight interaction segments $1_{11}$ and $2_{21}$, as port 4. One can observe that in FIG. 1 and 3 of the attached drawings, identical or substantially similar reference numerals are assigned indices related to the elements or components which are identical or similar.

In accordance with another characteristic of the present invention, the approach segment $1_{21}$ is rectilinear and collinear with the straight interaction segment $1_{11}$ to which it is connected. On the side of ports 5 and 6, the approach segment $1_{31}$ is itself rectilinear and collinear with straight segment $1_{11}$, while approach segment $2_{31}$ retains an inflection point between two curved sections. One understands that the longitudinal dimension of the waveguide design depicted in FIG. 1B is substantially less than that of FIG. 1A, thanks to benefits obtained from the port 4 side. From the port 5,6 side, no benefit is obtained in the length because of the separation d imposed by port 5,6, but benefit is obtained in the losses across guide 1 with respect to the design of FIG. 1A by eliminating transition losses between curved sections and straight sections in approach segment $1_{31}$.

One understands that as the geometry of the approach segments of the design of FIG. 1B is very different from that of the design of FIG. 1A, the coupling of these approach segments is different and therefore modifies the total coupling with respect to that obtained with the design of FIG. 1A. As we have seen above, in the application of the invention to telecommunications, it is necessary, however, that total coupling remain constant in order not to displace the peaks of the response curve depicted in FIG. 2, the wavelengths utilized being normalized. In accordance with the present invention, one compensates for the variation of the coupling due to the modification of the geometry of the approach segments, by a variation which corresponds to the coupling cl of the straight segments $1_{11}$ and $2_{11}$. This variation is obtained by acting upon the length l and the distance s of the straight interaction segments of the guides.

These modifications are readily determined thanks to the magnitude $x_o$ defined above.

It is necessary as a matter of fact to verify, for the two wavelengths of interest, $\lambda_1$ and $\lambda_2$, the relationship:

$$C(\lambda,s)l + C(\lambda,s)x_{01}(\lambda,s) = C(\lambda,s')l' + C(\lambda,s')x_{02}(\lambda,s')$$

The length of interaction of the straight segments must be modified from l to l' their separation from s to s', $x_{c1}$ and $x_{02}$ being respectively the old and new values of $X_o$.

The design of FIG. 1C is distinguished from that of FIG. 1B by the addition of a curved approach segment $2_{22}$, which increases the coupling of the approach segments with respect to that obtained in the design 1B, at the expense of a slight diminution in benefit in the length of the component as we will see later. The design for FIG. 1D comprises a curved approach segment $1_{23}$ upon guide 1, with an effect identical to the preceding. The design 1E combines the approach segments of design 1D on the side of port 4 and those of the standard design of FIG. 1A, on the side of port 5,6.

We have depicted in FIGS. 3A–3E filter designs A to E which correspond with the designs of the multiplexer/demultiplexer couplers A to E of FIG. 2. They are therefore distinguished only by the elimination of an attachment of an approach segment either at port 5 or port 6. Design F in FIG. 3F is derived from design E in FIG. 3E by a connection at port 5 instead of port 6. The design G comprises two waveguides 1,2 perfectly parallel and rectilinear. The following table gives, for each design of FIGS. 1A–1E and 3A–3G, the total length L obtained, the variation $\Delta l$ of the length of the interaction segments necessary for maintaining the coupling, as well as the variation $\Delta s$ of the separation between the two straight interaction segments.

| Motif | $\Delta l$ μm | $\Delta s$ μm | L (FIG. 1) mm | L (FIG. 3) mm |
|-------|---------------|---------------|---------------|---------------|
| A     | —             | —             | 21.933        | 11.700        |
| B     | +226          | −0.01         | 17.120        | 6.500         |
| C,D   | −305          | +0.07         | 18.620        | 7.800         |
| E,F   | −213          | +0.03         | 15.210        | 9.700         |
| G     | +1564         | +0.34         |               | 6.000         |

From an examination of this table it follows that with respect to what concerns the multiplexers/demultiplexers of FIGS. 1A–1E, the most compact design longitudinally is design E in FIG. 1E. As has been indicated above, the length of coupling $x_o$ due to the approach segments depends only weakly on the separation s: the values indicated in the table above remain therefore substantially constant whatever the value of separation s.

Furthermore, in the case of guides which are substantially circular produced by the doping of a glass substrate with thallium, the additional coupling length $x_o$ does not vary in practice any further when the separation of the guides is greater than 27 μm. In the case of the various geometries of the envisaged designs, and when one does not want the guide to continue to the edge of the substrate (the case with filters) it is sufficient to stop the guides as soon as this distance between guides is reached. In the present case with the radius of curvature of approach segments on the order of 100 mm, this distance between guides is reached after a length of the approach segments on the order of 1800 μm.

We may remark that, in accordance with the geometry utilized for approach segments, the length l of the straight interaction segments must be increased (designs B, G) or reduced (designs C, D, E, F).

Figure 6:
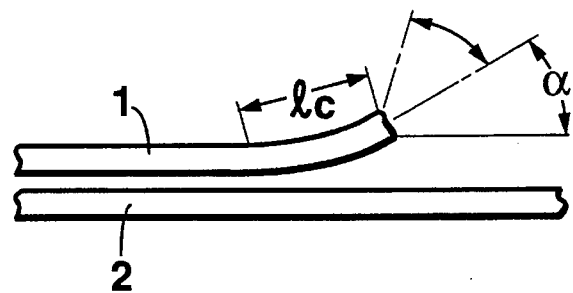
FIG. 6 depicts a detail of a filter in accordance with the invention.

With respect to the filters of FIGS. 3A–3G, if it is possible that the filtering guide is devoid of curvature at the input side, it is not always possible to do the same thing on the exit side: the termination being thus produced indeed would not be without reflection of the light in the guide or diffusion of the light in the substrate with possible recoupling in the output guide. If one can disregard the reflection effect mentioned above for guides having a gradient index obtained by diffusion of ions, it is absolutely necessary to prevent the recoupling resulting in the far field which then is on the order of a degree. As depicted in FIG. 6, we have given to the exit end of the filtering guide a curvature such that the angle of exit α of the filtering guide with respect to the other guide is at least equal to 1°, in order to avoid any recoupling in guide 2. With such an ending radius of curvature on the order of 100 mm, the length $l_c$ of this curved end must be of the order of 1.5 mm. In one embodiment of the invention, the diameter of this exit end segment (curved end) is substantially equal to that of the straight interaction segment to which the exit end segment is connected, with minor axial diffusion at the end of the exit end segment due to the ion exchange process. Furthermore, it is necessary to delineate, as a consequence, contingent adjacent designs of waveguides in order to avoid a recoupling in the latter.

All of the geometries of the designs described in connection with FIGS. 1A–1E and 3A–3G do not have the same performance in terms of isolation, insertion losses, curvature losses and transition losses. We call transition losses those which we observe at the juncture of a straight segment with a curved segment. The elimination, in accordance with the invention, of inflection points at least certain approach segments leads thus to a reduction of the number of said junctions and the number of curved sections, which leads to a diminution of the corresponding luminous power losses.

The elimination, in accordance with the invention, of at least one approach segment by rectilinearization of a guide thereby permits one to reduce considerably the longitudinal dimension of a guide, while diminishing the luminous power losses observed in this guide.

In the design of a multiplexer/demultiplexer in accordance with the invention, it is necessary to consider the modification of the geometry of the coupler resulting from the elimination/modification of the approach segments with inflection points. This entails a modification of the isolation in the two windows, that is to say of the separation of the two wavelengths considered.

The table shown below gives approximately the modifications of the isolation characteristics which are to be expected. In this table we call design of the type [n,m] a design in which n is the number of complete transfers between the guides at wavelength $\lambda_1$, and m the number for wavelength $\lambda_2$. If n<m, $\lambda_1<\lambda_2$.

| Design of the type | [1,2] | | [2,3] | | [3,4] | |
|---|---|---|---|---|---|---|
| λ | 1.3 | 1.55 | 1.3 | 1.55 | 1.3 | 1.55 |
| A | — | — | — | — | — | — |
| B | −0.3 db | −1.9 db | −1.2 db | +1.6 db | +1.1 db | ? |
| D | +0.8 db | −0.8 db | −1.5 db | — | — | −5. db |
| E | +0.8 db | −1. db | −0.6 db | −1.8 db | −1.1 db | −2.9 db |
| C | — | — | — | ? | −2.8 db | −1.5 db |

The performance in terms of losses is substantially equivalent for all of the designs B through E of FIGS. 1A–1E, all of the curvature losses being substantially diminished with respect to those of the standard design A in FIG. 1A. It is to be noted, however, that the curvature losses are not substantial until the radii of curvature utilized are less than 100 mm.

Design E of in FIG. 1E has the smallest length but at the expense of a substantial degradation of its performance. For this reason, design B of in FIG. 1B represents a satisfactory compromise.

Figure 3A:
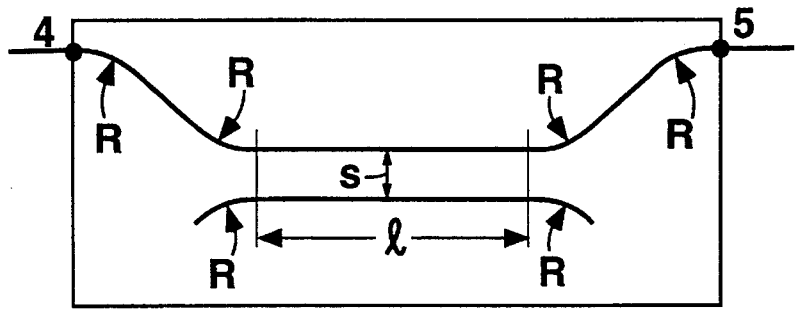
Figure 3B:
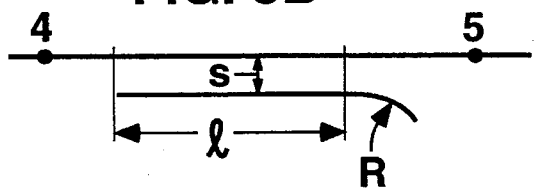
Figure 3C:
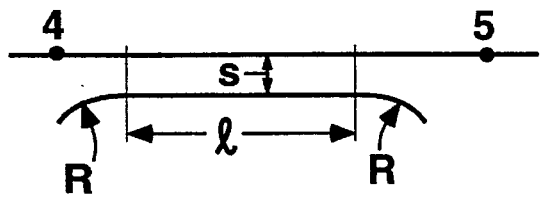
Figure 3D:
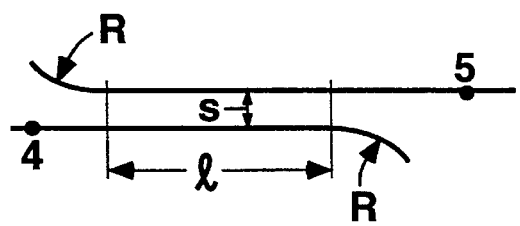
Figure 3E:
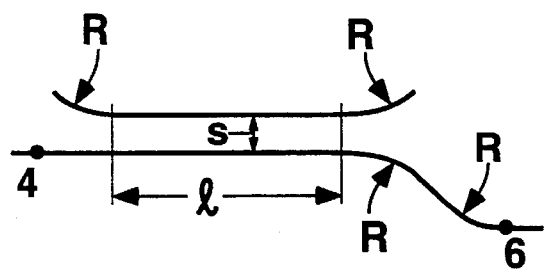
Figure 3F:
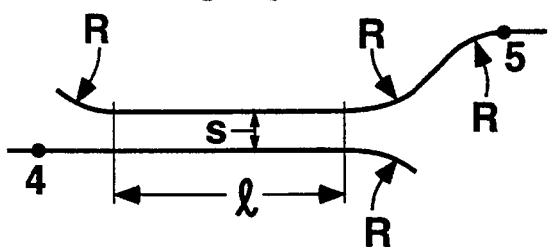
Figure 3G:
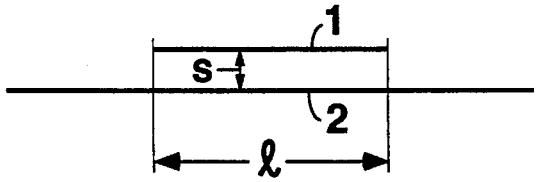

Of the filter designs depicted in FIGS. 3A–3G, design B in FIG. 3B is particularly short and is the choice of preference over design G in FIG. 3G which is particularly affected by a recoupling of the filtered light for the reasons set forth above.

It is finally to be noted that for all of the geometries and all of the components described above it is sometimes difficult technologically to produce a proximity coupler centered exactly on the two wavelengths of the multiplexer/demultiplexer. It is however possible to remedy this problem, a posteriori, by utilizing the properties of guides produced by ion exchange.

These ions indeed can be rediffused in the substrate when they are placed in a thermostatically controlled enclosure at a temperature close to Tg, the glass transition temperature. This rediffusion creates an increase of the dimension of the characteristic modes of the guides. We call characteristic mode of a waveguide any distribution of luminous intensity, perpendicular to the axis of propagation, which is propagated along this axis without deformation. The result is that the coupling between the two guides of a proximity coupler increases, as the overlap between the two modes is increasing. As the size of the modes diminishes with the wavelength, we find the spectral curve shifted toward the shorter wavelengths. This, effect, however, plays a sufficiently small role s as neither to modify substantially the separation between the multiplexed wavelengths, nor to substantially increase the coupling losses between the guide and the optical fibers to which it is attached. It is therefore possible, before producing the proximity coupler, to define a production procedure for a device for demultiplexing two wavelengths higher than those desired (for example 1330 and 1570 instead of 1310 and 1550 nm).

From the variability of the process it ensues that the demultiplexed wavelengths will be distributed between 1310/1550 nm and 1350/1590 nm. The utilization of the rediffusion procedure set forth above permits one to "reset" the components which are demultiplexing wavelengths which are too elevated, to the demultiplexing of wavelengths of desired values.

One can take advantage of the reduced dimensions of multiplexers/demultiplexers and filters, according to the invention, in order to integrate several components of this type upon the same glass substrate with finite dimensions. The multiplexers/demultiplexers are principally utilized today for increasing the signal transmission capacity of a single fiber. For that it is necessary to have a multiplexer at the input in order to combine the signals and a demultiplexer at the output in order to combine the signals and a demultiplexer at the output in order to separate them. This latter must have a strong isolation such that the separated signals do not become reciprocally mixed. This is how one must, for example, avoid having a telephone signal become combined with television signal. Currently one usually requires an isolation of 35 to 45 decibels for bandwidths of 60 nm around the wavelengths being considered. It is not, however, possible to attain such values with a simple proximity coupler without some means of auxiliary filtering.

One can produce a proximity coupler associated with such means of filtering by cascading proximity couplers on a single substrate and by taking care that all stages of the proximity couplers are identical. We have depicted in FIGS. 4A–4E several designs of such couplers. In the reading of these designs one takes into consideration the fact that the vertical scale is greatly expanded with respect to the horizontal scale.

Design B in FIG. 4B comprises three successive stages 7,8,9 of proximity couplers in a layout having two output branches 10,11. The design comprises filtering segments 15,16,17,18. The curved segments are all of the same curvature, calculated in such a way as to produce little diffusion loss. The guide ends such as 12 which end in the substrate are stopped and positioned in such a manner as to avoid any recoupling. In this respect, if one deems that there is a risk of such a recoupling, one can extend the segment involved up to the edge of the substrate: this is illustrated in segment 13 of design C in FIG. 4C, in other respects very close to design B in FIG. 4B. Design D in FIG. 4D consists of another symmetrical structure.

The design represented in A of in FIG. 4A consists of a straight branch comprising a coupler 20 and two filters 21, 22. The other branch diverges from the first and comprises two other filters 23, 24. The larger of the two wavelengths, $\lambda_2$, crosses the component in a straight line which permits the avoidance of all losses due to curvature. The existence of a curvature 25 on the exit branch of wavelength $\lambda_1$, the shorter, permits increased isolation thanks to these very losses. In effect, the longer the wavelength, the more the diffusion losses at the curves are important. To this effect, the radius of curvature of segment 25 of the exit branch of wavelength $\lambda_1$ can be chosen in such a way as to give negligible losses for the signal at wavelength $\lambda_1$, and considerable losses for the signal at wavelength $\lambda_2$.

We have depicted in E in of FIG. 4E a design similar to design A but comprising four stages of proximity couplers, the first, 25, separating the signals $\lambda_1$ and $\lambda_2$ and the three others 26, 27, 28 and 29, 30, 31, respectively, filtering these signals.

In all of the designs depicted in FIGS. 4A–4E one will observe that the geometry of each of the stages is such that all of the proximity couplers of the component have identical geometries or at least that the distance between guides in the course of coupling has the same variation.

We will remark further that the present invention permits us to graft filters to the approach segments of a coupler as is the case for example in 15, 16, 17, 18 in design B in FIG. 4B, or in 32, 33, 34, 35 of design D, in FIG. 4D. We thus increase further the density of a component integrating couplers and filters.

Figure 5:
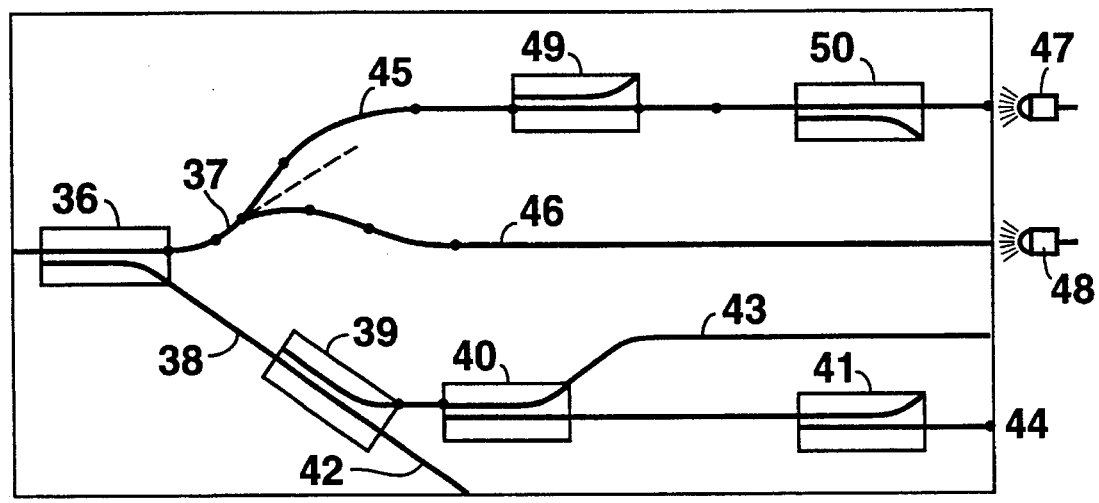
FIG. 5 depicts another embodiment of one such integrated optical component.

We have depicted in FIG. 5 of the attached drawings another integrated optical component made with the aid of couplers and filters in accordance with the present invention. This component answers the need for a domestic application permitting a telephone and a video hookup by optical fiber cable, aimed at residential buildings, apartments or individual homes. The component comprises a proximity coupler 36 with two exit branches one of which comprises a Y-junction 37 constituting a 1 by 2 coupler intended for the transmission/reception of a telephone signal, and the other 38 of which transmits a television signal. The 1 by 2 coupler can be, for example, of the type described in the French patent application No. 91 06039, filed May 17, 1991 by the applicant, such a coupler being particularly compact. Filters 39, 40, 41 filter from the video signal remaining component of the telephone signal. We will note the extension 42 of branch 38 and the extension 43 of filter 40, both of which extensions serve to avoid any recoupling, as we have seen earlier in connection with the designs of FIG. 4. The video signal is received at output 44 of the component.

Coupler 37 divides into two parts the carrier signal of the telephone signal, the two halves being directed by guides 45 and 46 respectively to a photosensitive receiver 47 and a signal transmitter 48, respectively. The acoustical signal is filtered in 49, 50 before reaching detector 47 in such a way that the latter receives a signal which is free of any video component. The transmitter 48 is made for example of a laser diode, assuring the transmission of the telephone signal which is to be sent out on the cable. This component, like the preceding ones described, takes advantage of the utilization of couplers and filters in accordance with the invention to provide a reduced dimension, permitting in particular improvement of the manufacturability of such components, as we have see above.

We claim:

1. A process for manufacturing an integrated optical device for proximity coupling between two waveguides in order to separate or combine signals of different wavelengths, said proximity coupling device operating at predetermined wavelengths, wherein the location of said wavelengths is adjusted by a heat treatment procedure after said waveguides are integrated in the substrate of the device.

2. The process of claim 1, wherein said predetermined operating wavelengths are approximately 1310 nm and 1550 nm, and the initial operating wavelengths of said device prior to said heat treatment procedure are 1310–1350 nm and 1550–1590 nm.

* * * * *